United States Patent
Hong

(10) Patent No.: US 6,575,392 B1
(45) Date of Patent: Jun. 10, 2003

(54) FLY FISHING REEL WITH A SEALING MEMBER

(76) Inventor: Eugene Hong, 11F-6, No. 333, Sec. 2, Hua-Mei W. St. Hsi-Tun Dist., Taichung City (TW)

(*) Notice: Subject to any disclaimer, the term of this patent is extended or adjusted under 35 U.S.C. 154(b) by 0 days.

(21) Appl. No.: 10/055,052

(22) Filed: Jan. 23, 2002

(51) Int. Cl.[7] .................. A01K 89/00; A01K 89/01; A01K 89/015
(52) U.S. Cl. .................. 242/319; 242/322; 242/321
(58) Field of Search .................. 242/319, 320, 242/321, 322, 310

(56) References Cited

U.S. PATENT DOCUMENTS

| | | | | |
|---|---|---|---|---|
| 4,451,012 A | * | 5/1984 | Puryear et al. | 242/319 |
| 4,805,849 A | * | 2/1989 | Nanbu | 242/319 |
| 5,386,948 A | * | 2/1995 | Sato | 242/313 |
| 5,718,392 A | * | 2/1998 | Moosberg | 242/321 |
| 5,873,535 A | * | 2/1999 | Jeung | 242/314 |
| 5,996,918 A | * | 12/1999 | Nanbu | 242/267 |
| 6,102,317 A | * | 8/2000 | Bernard et al. | 242/319 |
| 6,267,312 B1 | * | 7/2001 | Farris et al. | 242/295 |
| 6,286,772 B1 | * | 9/2001 | Koelewyn | 242/246 |
| 6,286,773 B1 | * | 9/2001 | Ikuta | 242/260 |

* cited by examiner

Primary Examiner—Emmanuel Marcelo
(74) Attorney, Agent, or Firm—Brian T. Sattizahn; McNees Wallace & Nurick LLC

(57) ABSTRACT

A fly fishing reel includes a casing having two opposite ends and a peripheral wall extending between and cooperating with the opposite ends to confine an inner space thereamong. A spool is mounted rotatably in the casing and has two opposite flange portions with free ends that are radially and respectively spaced apart from the peripheral wall by first and second gaps. The flange portions divide the inner space into two opposite end chambers and an intermediate chamber which is in fluid communication with the opening and the end chambers via the first and second gaps. A pair of elastic sealing rings are respectively interposed between the free ends of the flange portions and the peripheral wall so as to seal the first and second gaps for preventing dust and liquid from entering into the end chambers via the opening and the intermediate chamber from the exterior of the casing.

6 Claims, 9 Drawing Sheets

FLY FISHING REEL WITH A SEALING MEMBER

BACKGROUND OF THE INVENTION

1. Field of the Invention

This invention relates to a fly fishing reel, more particularly to a drum-type fly fishing reel with a sealing member in a spool casing for preventing dust and liquid from entering into the casing.

2. Description of the Related Art

A conventional drum-type fly fishing reel normally includes a cylindrical casing with a shaft and a spool mounted rotatably therein. The conventional fishing reel is disadvantageous in that undesirable substances, such as dust, rain, and sea water, tend to enter into the casing and damage components, such as bearings and transmission gear parts, in the casing.

SUMMARY OF THE INVENTION

Therefore, the object of the present invention is to provide a fly fishing reel with sealing rings so as to be capable of overcoming the aforementioned drawback.

According to the present invention, a fly fishing reel comprises: a generally cylindrical casing having two opposite ends and a peripheral wall extending between and cooperating with the opposite ends to confine an inner space thereamong, the peripheral wall having an opening that is in fluid communication with the inner space; a main shaft disposed in the inner space and co-axially extending between and mounted on the opposite ends of the casing; a spool having a cylindrical portion sleeved on the main shaft and two opposite flange portions respectively and radially extending from two opposite ends of the cylindrical portion toward the peripheral wall, the flange portions having free ends that are radially and respectively spaced apart from the peripheral wall by first and second gaps, the flange portions dividing the inner space into two opposite end chambers and an intermediate chamber which is disposed between the end chambers and which is in fluid communication with the opening and the end chambers via the first and second gaps; and a pair of elastic sealing rings respectively interposed between the free ends of the flange portions and the peripheral wall so as to seal the first and second gaps for preventing dust and liquid from entering into the end chambers via the opening and the intermediate chamber from the exterior of the casing.

BRIEF DESCRIPTION OF THE DRAWINGS

In drawings which illustrate embodiments of the invention.

DETAILED DESCRIPTION OF THE PREFERRED EMBODIMENTS

Figure 1:
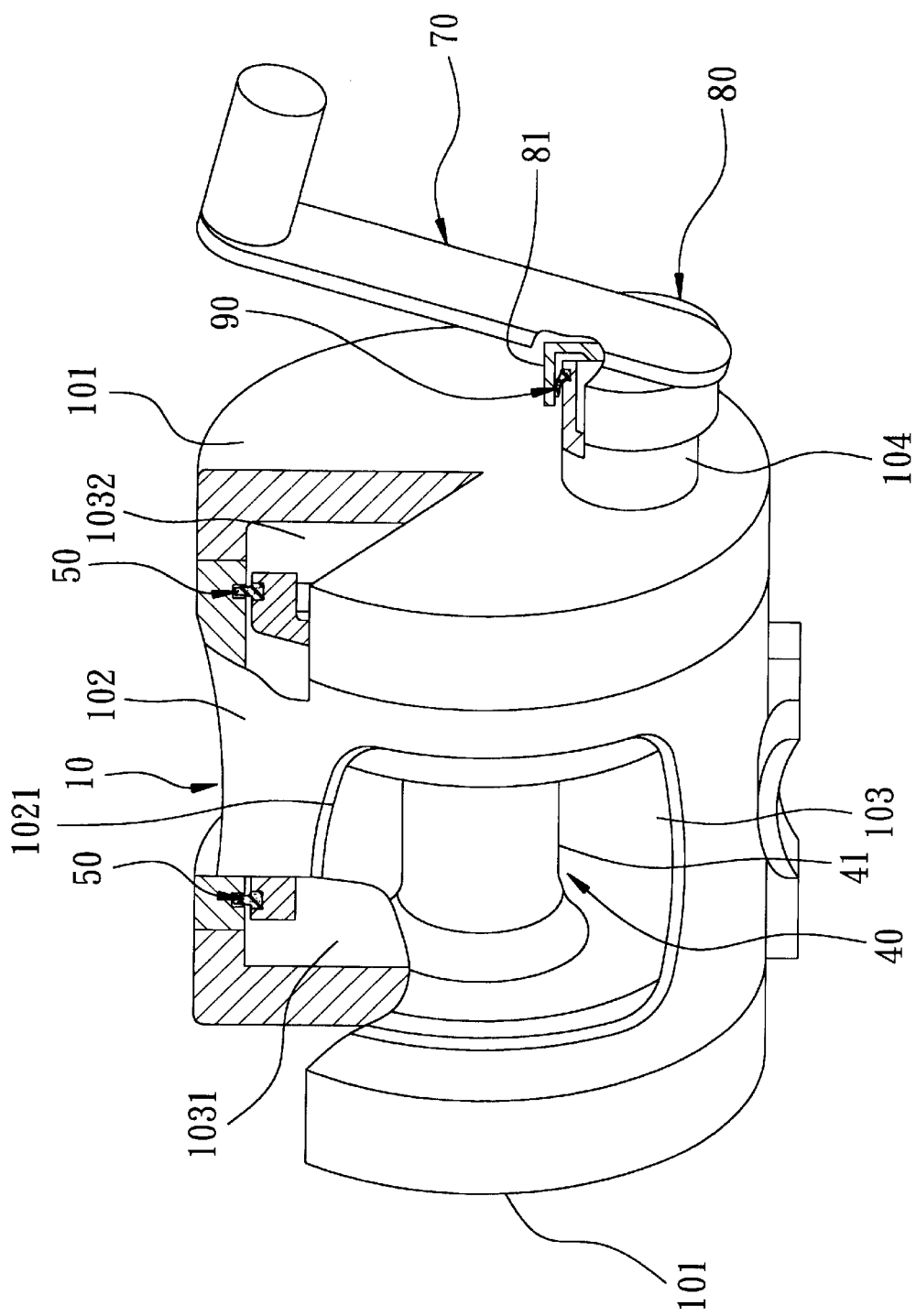
FIG. 1 is a perspective partly cutaway view of the first preferred embodiment of a fly fishing reel of this invention.
Figure 2:
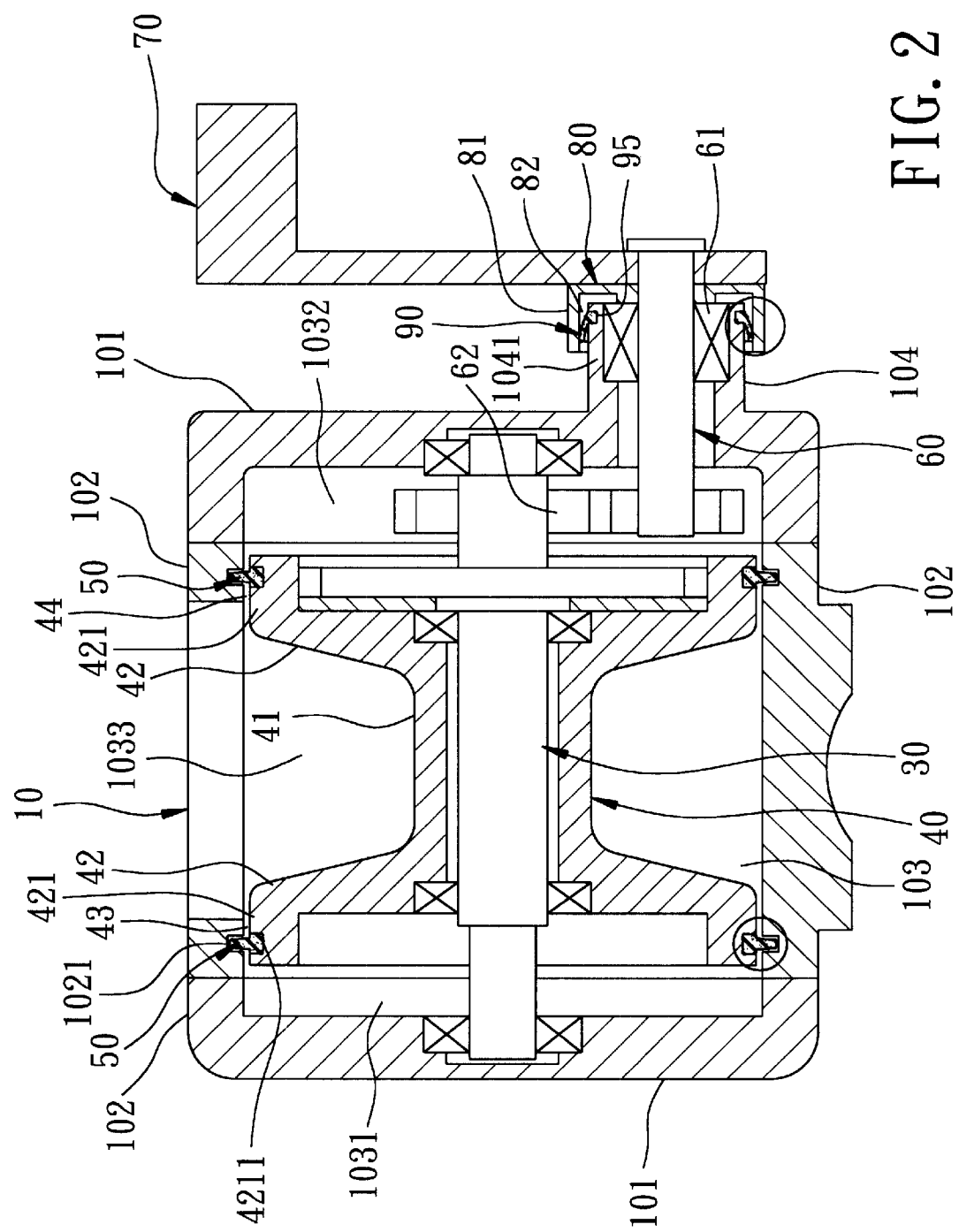
FIG. 2 is a sectional view of the first preferred embodiment.
Figure 3A:
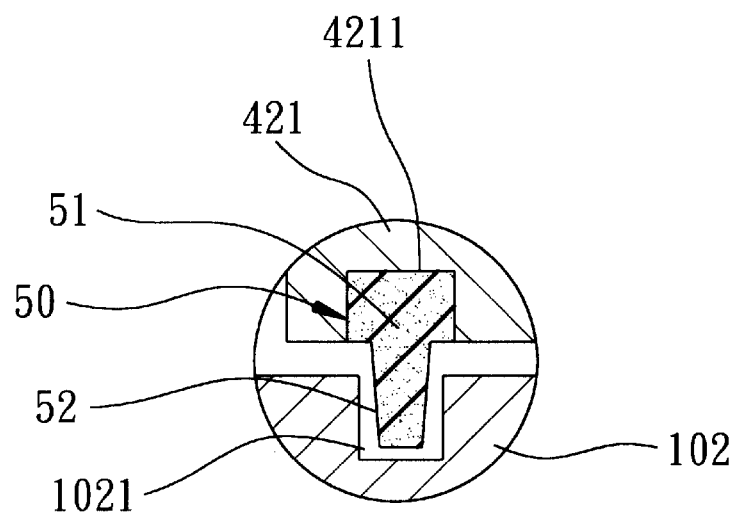
FIG. 3A is an enlarged view of an encircled part in FIG. 2 to illustrate how a first sealing ring is associated with a spool and a casing of the first preferred embodiment.
Figure 3B:
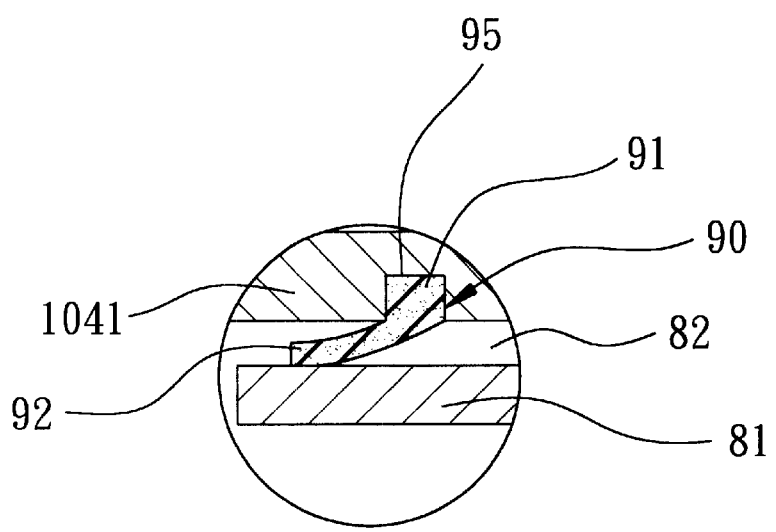
FIG. 3B is an enlarged view of another encircled part in FIG. 2 to illustrate how a second sealing ring is associated with an end flange and a bearing cap of the first preferred embodiment.

FIGS. 1, 2, 3A and 3B illustrate a first preferred embodiment of a fly fishing reel of this invention.

The fly fishing reel includes: a generally cylindrical casing 10 having two opposite ends 101 and a peripheral wall 102 extending between and cooperating with the opposite ends 101 to confine an inner space 103 thereamong, the peripheral wall 102 having an opening 1021 that is in fluid communication with the inner space 103; a main shaft 30 disposed in the inner space 103 and co-axially extending between and mounted on the opposite ends 101 of the casing 10; a spool 40 having a cylindrical portion 41 sleeved on the main shaft 30 and two opposite flange portions 42 respectively and radially extending from two opposite ends of the cylindrical portion 41 toward the peripheral wall 102, the flange portions 42 having free ends 421 that are radially and respectively spaced apart from the peripheral wall 102 by first and second gaps 43, 44, the flange portions 42 dividing the inner space 103 into two opposite end chambers 1031, 1032 and an intermediate chamber 1033 which is disposed between the end chambers 1031, 1032 and which is in fluid communication with the opening 1021 and the end chambers 1031, 1032 via the first and second gaps 43, 44; and a pair of elastic sealing rings 50 respectively interposed between the free ends 421 of the flange portions 42 and the peripheral wall 102 so as to seal the first and second gaps 43, 44 for preventing dust and liquid from entering into the end chambers 1031, 1032 via the opening 1021 and the intermediate chamber 1033 from the exterior of the casing 10.

The free ends 421 of the flange portions 42 are respectively formed with a pair of annular first grooves 4211. The peripheral wall 102 of the casing 10 is formed with a pair of annular second grooves 1021 that are respectively and radially registered with the first grooves 4211. Each of the sealing rings 50 includes a first annular portion 51 that is fittingly inserted into a respective one of the first grooves 4211, and a second annular portion 52 that extends from the first annular portion 51 into a respective one of the second grooves 1021.

The casing 10 has an annular end flange 104 projecting axially from one of the opposite ends 101 of the casing 10. The end flange 104 has a free end 1041. The fly fishing reel further includes a bearing 61 installed in the free end 1041 of the end flange 104, a bearing cap 80 capping the free end 1041 of the end flange 104, and a driving shaft 60 parallel to the main shaft 30 and co-axially extending through the bearing cap 80, the bearing 61 and the end flange 104 and into the inner space 103 to connect with the main shaft 30 via a gear unit 62. The bearing cap 80 has a peripheral wall 81 surrounding and radially spaced apart from the free end 1041 of the end flange 104 by a clearance 82 which is in fluid communication with the inner space 103. The fly fishing reel further includes an elastic second sealing ring 90 interposed between the free end 1041 of the end flange 104 and the peripheral wall 81 of the bearing cap 80 so as to seal the clearance 82 for preventing dust and liquid from entering into the inner space 103 via the end flange 104 from the exterior of the casing 10. A handle 70 is connected to the driving shaft 60 for rotating the main shaft 30.

The end flange 104 is formed with a retaining groove 95. The second sealing ring 90 has a first annular portion 91 that is fittingly inserted into the retaining groove 95, and a second annular portion 92 that extends from the first annular portion 91 to slidably contact the peripheral wall 81 of the bearing cap 80.

Figure 4:
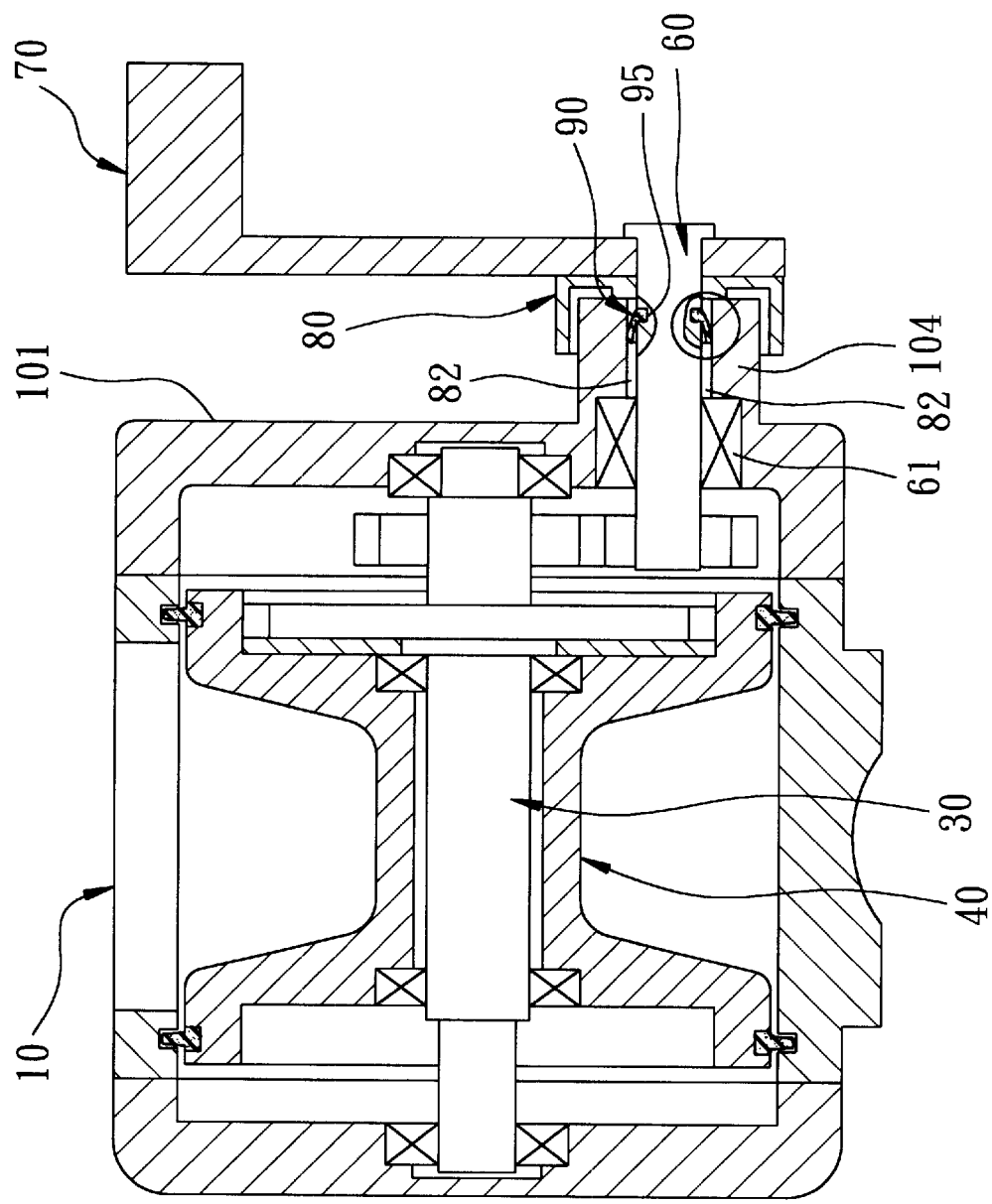
FIG. 4 is a sectional view of the second preferred embodiment of the fly fishing reel of this invention.
Figure 5:
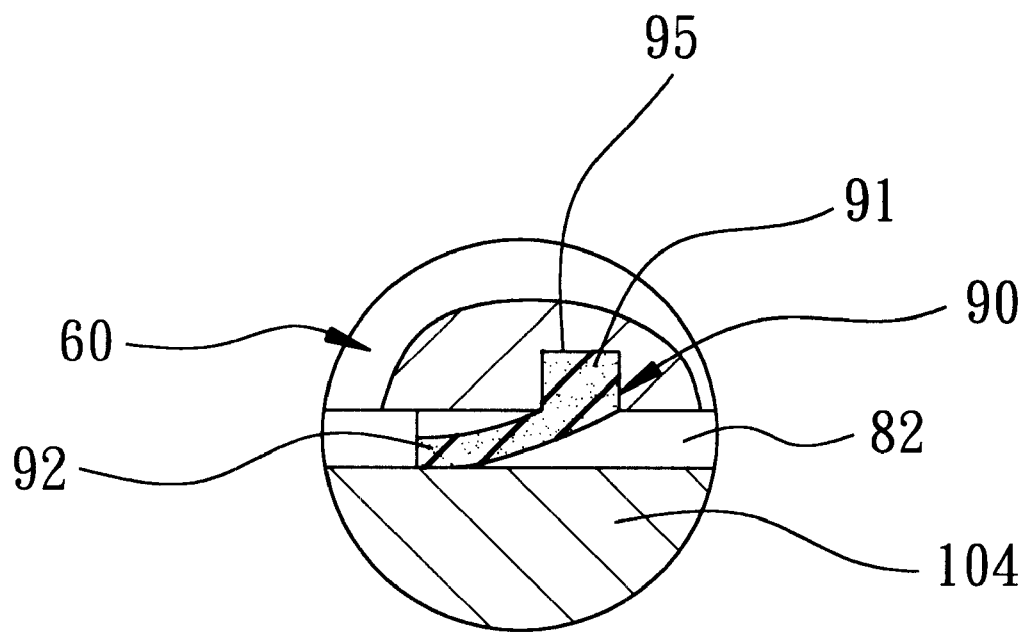
FIG. 5 is an enlarged view of an encircled part in FIG. 4 to illustrate how the second sealing ring is associated with a driving shaft and the end flange in the second preferred embodiment.

FIGS. 4 and 5 illustrate a second preferred embodiment of the fly fishing reel of this invention which is similar to the previous embodiment, except that the bearing 61 is mounted in the other end of the end flange 104, that the clearance 82 is formed between the driving shaft 60 and the end flange 104, and that the retaining groove 95 is formed in the driving shaft 60 adjacent to the bearing cap 80.

Figure 6:
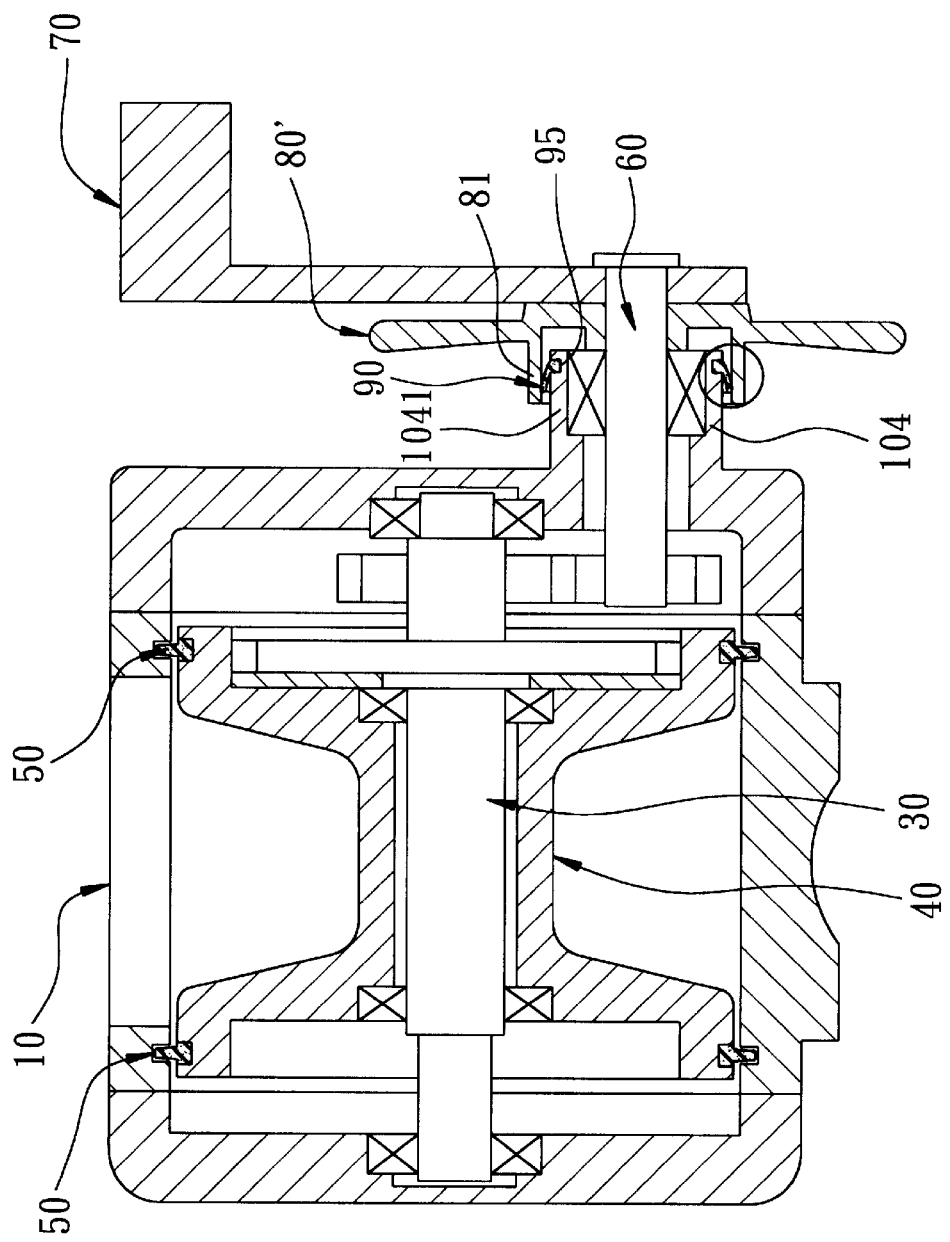
FIG. 6 is a sectional view of the third preferred embodiment of the fly fishing reel of this invention.
Figure 7:
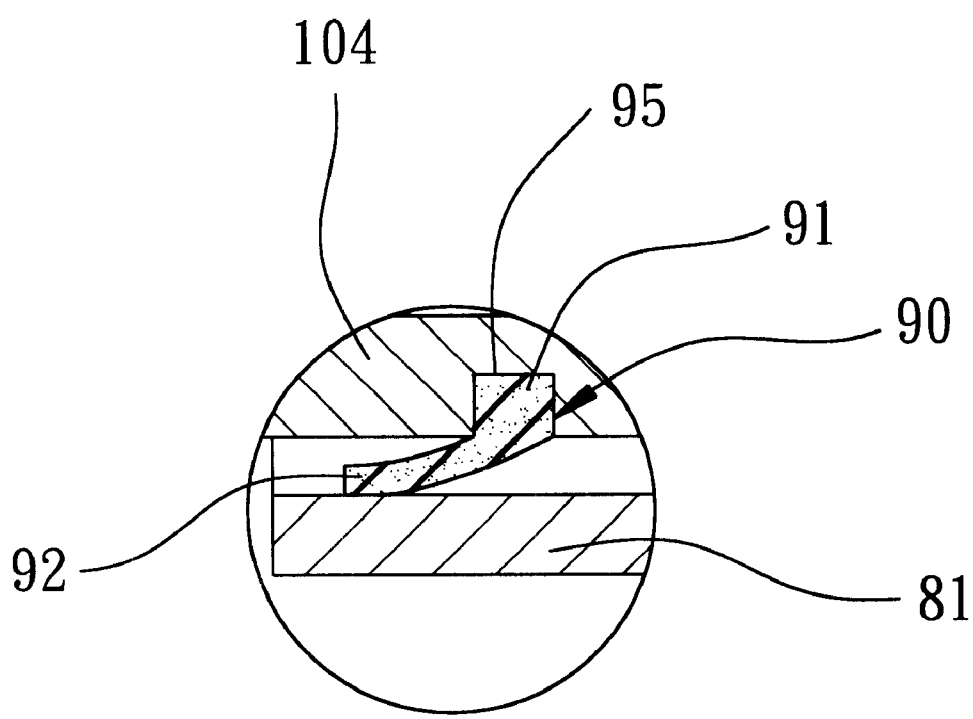
FIG. 7 is an enlarged view of an encircled part in FIG. 6 to illustrate how the second sealing ring is associated with a drag adjustment lever and the end flange in the third preferred embodiment.

FIGS. 6 and 7 illustrate a third preferred embodiment of the fly fishing reel of this invention, which is similar to the first embodiment, except that the bearing cap 80 is replaced with a drag adjustment lever 80' which has a cap portion that is similar to the bearing cap 80 and which is rotatable about the driving shaft 60 for adjusting quantity of drag resistance to the rotation of the spool 40.

Figure 8:
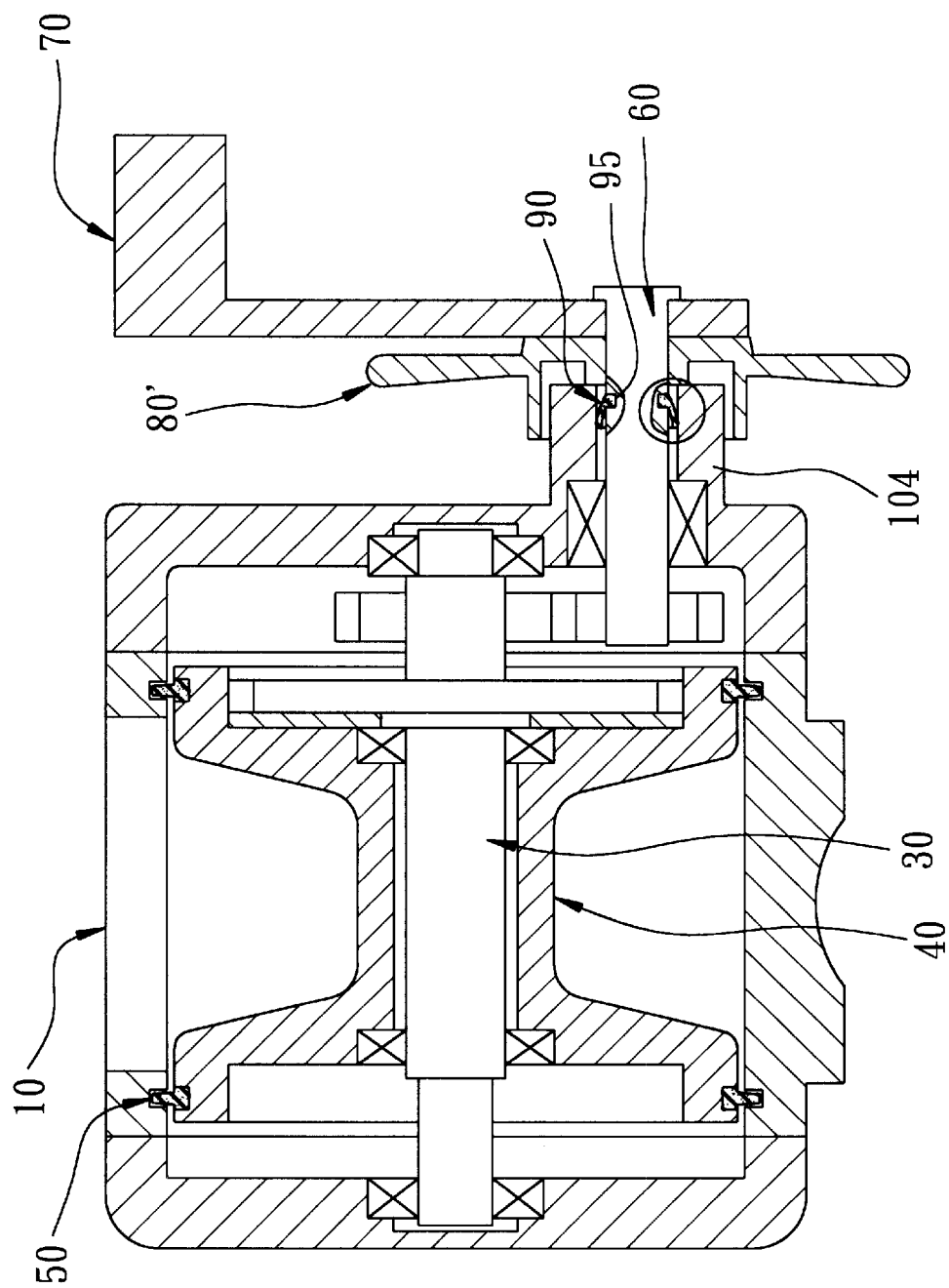
FIG. 8 is a sectional view of the fourth preferred embodiment of the fly fishing reel of this invention.
Figure 9:
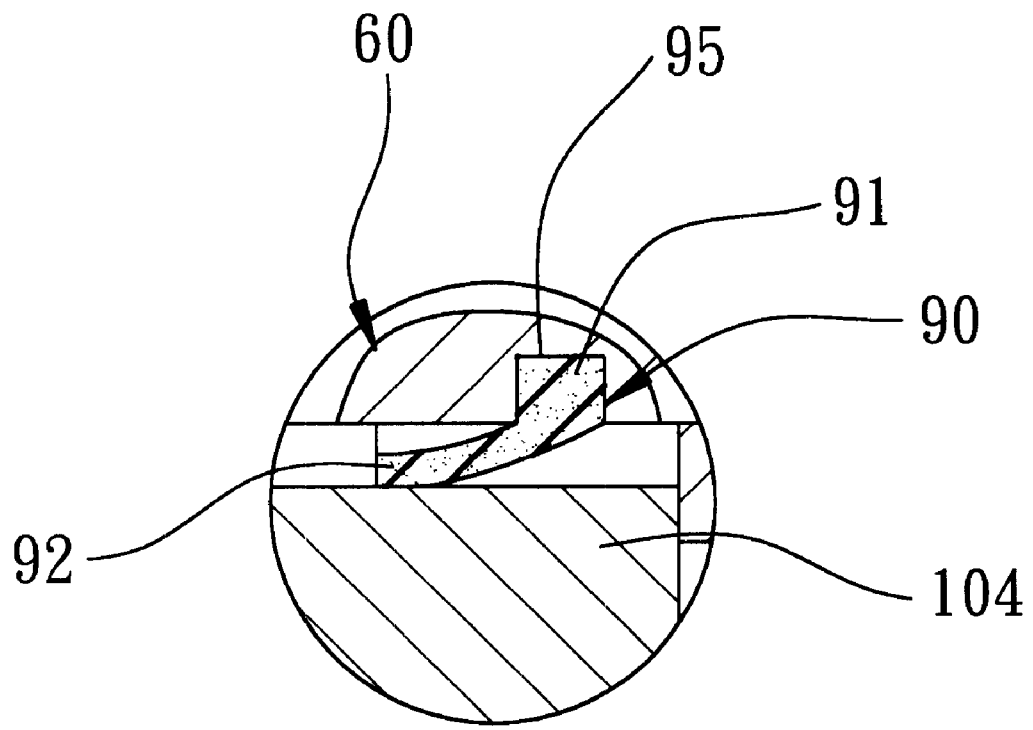
FIG. 9 is an enlarged view of an encircled part in FIG. 8 to illustrate how the second sealing ring is associated with the driving shaft and the end flange in the fourth preferred embodiment.

FIGS. 8 and 9 illustrate a fourth preferred embodiment of the fly fishing reel of this invention, which is similar to the second embodiment, except that the bearing cap 80 is replaced with the drag adjustment lever 80'.

With the inclusion of the first and second sealing rings 50, 90 in the fly fishing reel of this invention, the aforesaid drawback encountered in the prior art can be eliminated.

With the invention thus explained, it is apparent that various modifications and variations can be made without departing from the spirit of the present invention. It is therefore intended that the invention be limited only as recited in the appended claims.

I claim:

1. A fly fishing reel comprising:
   a generally cylindrical casing having two opposite ends and a peripheral wall extending between and cooperating with said opposite ends to confine an inner space thereamong, said peripheral wall having an opening that is in fluid communication with said inner space;
   a main shaft disposed in said inner space and co-axially extending between and mounted on said opposite ends of said casing;
   a spool having a cylindrical portion sleeved on said main shaft and two opposite flange portions respectively and radially extending from two opposite ends of said cylindrical portion toward said peripheral wall, said flange portions having free ends that are radially and respectively spaced apart from said peripheral wall by first and second gaps, said flange portions dividing said inner space into two opposite end chambers and an intermediate chamber which is disposed between said end chambers and which is in fluid communication with said opening and said end chambers via said first and second gaps; and
   a pair of elastic sealing rings respectively interposed between said free ends of said flange portions and said peripheral wall so as to seal said first and second gaps for preventing dust and liquid from entering into said end chambers via said opening and said intermediate chamber from the exterior of said casing.

2. The fly fishing reel of claim 1, wherein said free ends of said flange portions are respectively formed with a pair of annular first grooves, said peripheral wall being formed with a pair of annular second grooves that are respectively and radially registered with said first grooves, each of said sealing rings including a first annular portion that is fittingly inserted into a respective one of said first grooves, and a second annular portion that extends from said first annular portion into a respective one of said second grooves.

3. The fly fishing reel of claim 1, wherein said casing has an annular end flange projecting axially from one of said opposite ends of said casing, said fly fishing reel further comprising a driving shaft parallel to said main shaft and co-axially extending through said end flange to connect with said main shaft, said driving shaft being radially spaced apart from said end flange by a clearance which is in fluid communication with said inner space, said fly fishing reel further comprising an elastic second sealing ring interposed between said end flange and said driving shaft so as to seal said clearance for preventing dust and liquid from entering into said inner space from the exterior of said casing.

4. The fly fishing reel of claim 3, wherein said driving shaft is formed with a retaining groove, said second sealing ring having a first annular portion that is fittingly inserted into said retaining groove, and a second annular portion that extends from said first annular portion to slidably contact said end flange.

5. The fly fishing reel of claim 1, wherein said casing has an annular end flange projecting axially from one of said opposite ends of said casing, said end flange having a free end, said fly fishing reel further comprising a bearing installed in said free end of said end flange, a bearing cap capping said free end of said end flange, and a driving shaft parallel to said main shaft and co-axially extending through said end flange, said bearing and said bearing cap and into said inner space, said bearing cap having a peripheral wall surrounding and radially spaced apart from said free end of said end flange by a clearance which is in fluid communication with said inner space, said fly fishing reel further comprising an elastic second sealing ring interposed between said free end of said end flange and said peripheral wall of said bearing cap so as to seal said clearance for preventing dust and liquid from entering into said inner space said end flange from the exterior of said casing.

6. The fly fishing reel of claim 5, wherein said end flange is formed with a retaining groove, said second sealing ring having a first annular portion that is fittingly inserted into said retaining groove, and a second annular portion that extends from said first annular portion to slidably contact said peripheral wall of said bearing cap.

* * * * *